(12) United States Patent
Bigbee et al.

(10) Patent No.: US 6,526,431 B1
(45) Date of Patent: Feb. 25, 2003

(54) MAINTAINING EXTENDED AND TRADITIONAL STATES OF A PROCESSING UNIT IN TASK SWITCHING

(75) Inventors: Bryant Bigbee, Aloha, OR (US); Kenneth S. Reneris, Bellview, OR (US); Shivnandan D. Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/257,923

(22) Filed: Feb. 26, 1999

(51) Int. Cl.$^7$ ................................................. G06F 9/00
(52) U.S. Cl. ........................................ 709/108; 712/228
(58) Field of Search ................................. 709/107, 108; 712/228, 229

(56) References Cited

U.S. PATENT DOCUMENTS 5,428,779 A * 6/1995 Allegrucci et al. ......... 709/108
6,134,143 A * 10/2000 Norman ................. 365/185.07
6,170,997 B1 * 1/2001 Glew et al. .................. 712/217
6,230,259 B1 * 5/2001 Christie et al. .............. 712/228

* cited by examiner

Primary Examiner—John A. Follansbee
Assistant Examiner—David England
(74) Attorney, Agent, or Firm—Blakley, Sokoloff, Taylor & Zafman LLP

(57) ABSTRACT

The present invention is a method and apparatus for switching first and second tasks in an operating system. The first and second tasks each have first and second traditional states and first and second extended states, in a processing unit. The method comprises: (a) saving the first traditional and extended states from the processing unit to a buffer; (b) updating the buffer by replacing the first extended state by the second extended state; and (c) restoring the first traditional state and the second extended state in the processing unit from the updated buffer.

25 Claims, 10 Drawing Sheets

MAINTAINING EXTENDED AND TRADITIONAL STATES OF A PROCESSING UNIT IN TASK SWITCHING

BACKGROUND

1. Field of the Invention

This invention relates in general to computer systems, and more particularly, to task switching.

2. Description of Related Art

Multitasking operating systems virtualize the use of the processor by maintaining the architectural state for each task. This process is typically carried out by saving the architectural state of the outgoing task from the processor to operating system data structures in memory and restoring the saved architectural state of the incoming task from the OS data structures into the processor. When a processor has other internal processing elements (e.g., floating point unit), the architectural state of these processing elements corresponding to each task needs to be maintained also.

On uniprocessor systems, the process of saving or restoring the architectural state of the floating-point unit (FPU) is traditionally performed in a lazy fashion. When a task that does not "own" the FPU executes a floating-point (FP) instruction, a Device Not Available (DNA) exception is raised. When the DNA exception is raised, the operating system (OS) has to set some state for the outgoing and incoming tasks; for the outgoing task so that the next time it executes a FP instruction, it will generate a DNA and for the incoming task so that the next FP instruction does not generate a DNA exception. The DNA exception handler saves the FP state of the task owning the FPU to the corresponding OS data structure and restores the FP state of the incoming task, from the structure in which its state had previously been saved. On multiprocessor systems, typically the FP state of a task being context switched out is saved by the OS.

When the processor or its internal FPU is updated with extended capabilities, the traditional exception handler used by the OS may not be able to access the extended state of the processor or the FPU. To accommodate these updates, the OS has to be redesigned, requiring significant modifications to the OS internal data structures and exception handlers. This leads to significant development and validation effort in the OS, resulting in long turn-around time for introduction of an OS that is compatible with the extended capabilities of the processor and/or its FPU.

Accordingly, there is a need in the technology for providing a cost-effective and efficient method for handling task switching involving extended states, without having to modify the operating system.

SUMMARY

The present invention is a method and apparatus for switching first and second tasks in an operating system. The first and second tasks each have first and second traditional states and first and second extended states, in a processing unit. The method comprises: (a) saving the first traditional and extended states from the processing unit to a buffer; (b) updating the buffer by replacing the first extended state by the second extended state; and (c) restoring the first traditional state and the second extended state in the processing unit from the updated buffer.

DESCRIPTION

The present invention is a method and apparatus for maintaining the extended architectural state of the processing unit during task switching. The technique provides an OS-independent driver that enhances the traditional exception handling capabilities of existing operating systems. The technique allows tasks on existing OS platforms to access the extended capabilities of the processing unit without major modifications to the OS.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
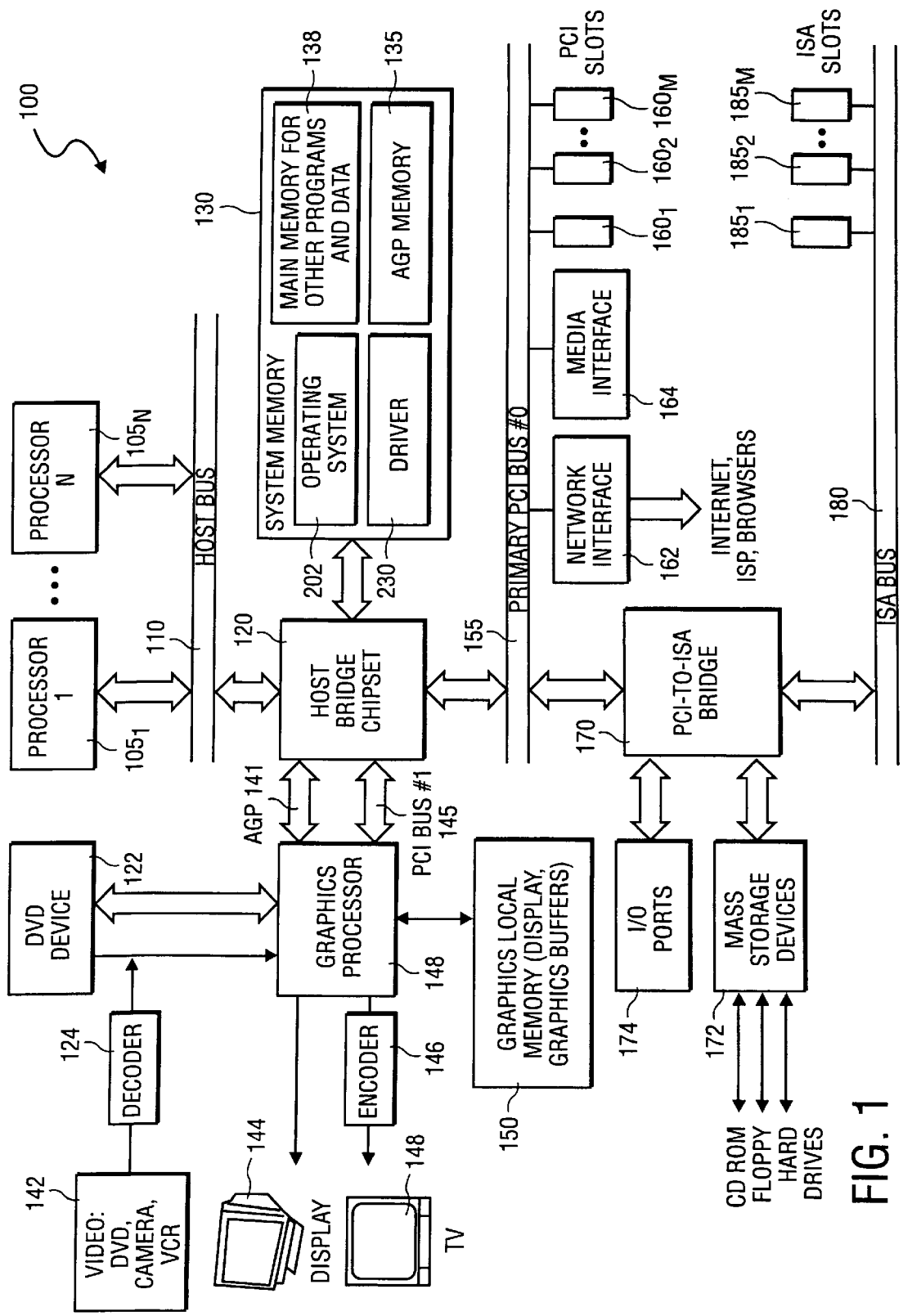
FIG. 1 is a diagram illustrating a computer system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a graphics processor 140, a DVD device 122, a video device 142, a decoder 124, a display monitor 144, a television (TV) 148, an encoder 146, a graphics local memory 150, a primary PCI bus #0 155, a PCI bus #1 145, an accelerated graphics port (AGP) 141, K PCI slots $160_1$ to $160_K$, a network interface 162, a media interface 164, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 includes an operating system (OS) 202, a driver 230, an AGP memory block 135, and other programs and data 138. Of course, the system memory 130 preferably contains additional software (not shown), which is not necessary to understanding the invention.

When implemented in software, the elements of the driver 230 include the code segments to maintain the extended states of the processing unit during task switching. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc. The PCI slots $160_1$ to $160_K$ provide interfaces to PCI devices. Examples of PCI devices include the network interface 162 and the media interface 164. The network interface 162 connects to communication channel such as the Internet. The Internet provides access to on-line service providers, Web browsers, and other network channels. The media interface 164 provides access to audio and video devices.

The graphics processor 140 is a high performance graphics controller that perform graphics functions such as 3-D rendering operations, progressive meshes, painting, drawing, etc. The graphics processor 140 is coupled to the host bridge 120 via the AGP 141 and the PCI bus #1 145. In one embodiment, the AGP 141 is developed by Intel Corporation of Santa Clara, Calif. The graphics processor 140 has access to its own graphics local memory 150. The graphic local memory 150 may contain graphics programs and data for displaying. The DVD device 122 represents any digital video device or instrument. The video device 142 provides video input such as DVD, camera, or video cassette recorder (VCR) to the graphics processor 140. The decoder 124 decodes the video signals from the video device 142 and merges to the video signal to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge provides access to the ISA bus 180, mass storage devices 172, and I/O ports 174. The mass storage devices 172 include CD ROM, floppy diskettes, and hard drives. The ISA bus 180 has a number of ISA slots $185_1$ to 185M to interface to ISA devices. Examples of ISA devices include data entry devices (e.g., keyboard, mouse), printers, etc.

Figure 2A:
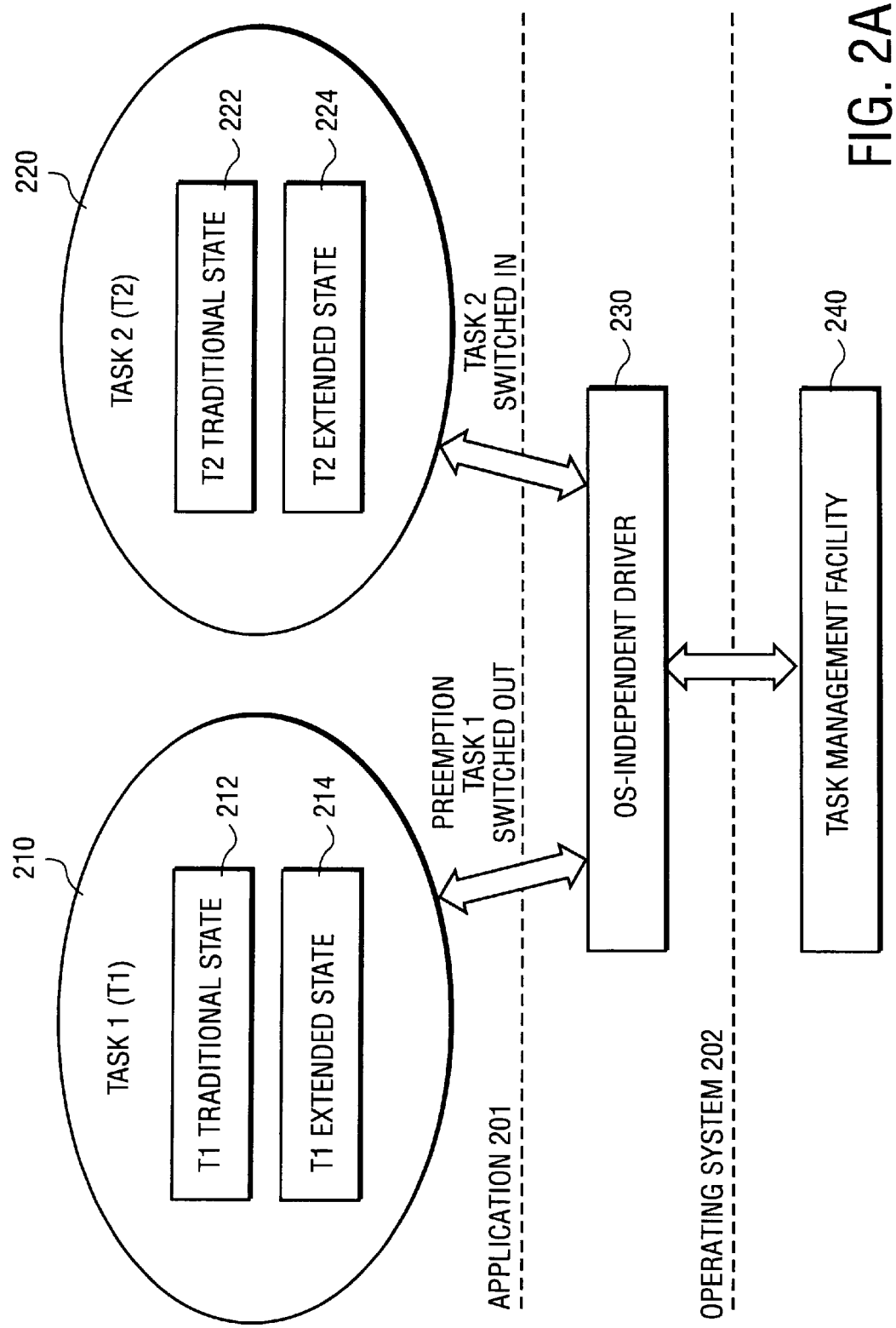
FIG. 2A is a functional diagram illustrating a task switching process according to one embodiment of the invention.

FIG. 2A is a functional diagram illustrating a task switching process according to one embodiment of the invention. FIG. 2A shows two logical areas: an application 210 and an operating system 202. The two logical areas are linked by an operating system (OS) independent driver 230.

In the application area 201, there are two tasks: a task 1(T1) 210 and a task 2 (T2) 220. In the operating system 202, there is a task management facility 240. As is known by one skilled in the art, the OS 202 may have other elements such as a task scheduler, a task prioritizer, etc. The task management facility 240 includes functions or routines to manage task switching. These functions may include a task switching function and a state saving function. The OS platform may be any convenient OS. In one embodiment, the OS platform includes the Microsoft Windows NT Version 4.0. It is contemplated that other OS platforms can be used such as, Windows 95, Linux, BeOS, Solaris, and Unixware.

In the illustrative example shown in FIG. 2A, the T1 210 and the T2 220 are two tasks running in the application area 201. The T1 210 is pre-empted by the OS and T2 220 is scheduled for execution. The OS switches 210 by de-allocating resources from T1 which include the processor and the processing units (e.g., the floating-point unit, FPU). When T1 is switched out and T2 220 is switched in, the states of the processor and the processing units corresponding to these two tasks need to be saved and restored accordingly. Although the following discussion refers to the processing unit inside the processor, in particular, the floating-point unit (FPU), the technique can be extended to any other situations, such as other processing units or the processor itself.

The T1 210 includes a T1 traditional state 212 and a T1 extended state 214. The T2 220 includes a T2 traditional state 222 and a T2 extended state 224. When task switching occurs, it is desirable to save the T1 traditional state 212 and T1 extended state 214 in some buffer or memory that can be retrieved or restored later. It is also desirable to restore or transfer the contents of the T2 traditional state 222 and T2 extended state into the processing unit (e.g., the FPU).

The operating system 202 represents a traditional operating system which has a traditional task switching mechanism involving the traditional state of the processing unit. Since the processing unit has both traditional and extended states, the OS 202 is not able to save or restore the extended states directly. The OS-independent driver 230 enables the OS to perform the task switching involving both the traditional and extended states of the processing unit in a non-intrusive manner. The OS-independent driver 230 allows application programs and drivers to use the existing OS to access the extended capabilities of the processor and/or the processing units inside the processor. In addition, the users can still use existing application programs written for the existing OS.

In one embodiment, the processing unit is a floating-point unit (FPU) having extended capabilities. The extended capabilities of the FPU may include the following attributes:

Extended register sets including 16-byte boundary alignment.

The format of the data structure in the extended register set is constant for all operational modes of the processor including the protected mode and the real-address mode.

The saving of the contents of the traditional and extended registers can be performed in one instruction, e.g., the extended save instruction (XSAVE). The saved contents of the traditional and extended registers are restored by a single instruction, e.g., the extended restore instruction (XRESTORE).

As is known by one skilled in the art, the technique in the present invention is not limited to the extended architecture of the FPU. The technique can be applied to any other architecture in which an existing architecture having a traditional state is enhanced by an extended architecture having an extended state. In the following description, the term processor refers to the microprocessor or the central processing unit (CPU); the term processing unit refers to a processing element inside the processor (e.g., arithmetic units, FPU)

The mechanism of the OS-independent driver is based on the following:

Use the extended state save instruction that has the property of keeping the complete or full processing unit state (including both traditional and extended states) within the processing unit after the save instruction is executed. These instructions have the additional property of not reporting any pending exceptions (e.g., floating point exceptions) when saving/restoring the extended states.

Use the extended instructions to enhance the DNA exception handler without modifying the OS.

Use the traditional state instructions including the state save instruction TSAVE and the state restore instruction TRESTORE, which have the property of affecting only the traditional states, and not the extended states.

The technique provides support for the new extended registers in a transparent manner with respect to the OS. This is accomplished by first gaining control of the DNA exception raised by the processing unit. Then the extended instructions are used to access the extended state. Subsequently, the traditional DNA handler is invoked to operate on the traditional state. The OS continues to maintain the data structures and the specific states of the processor control registers, and the traditional processing unit state without any influence of the added code in the OS-independent driver.

Figure 2B:
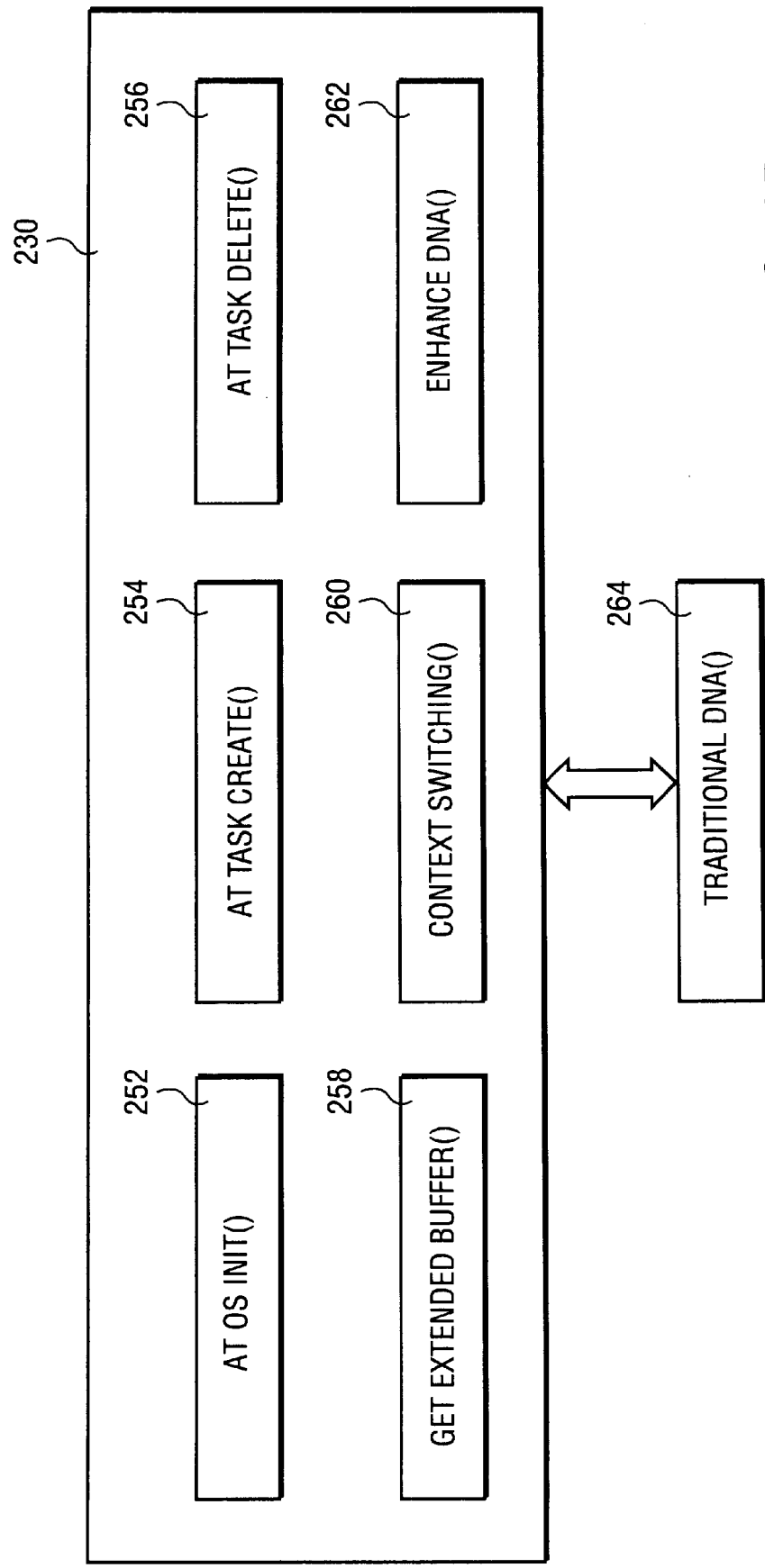
FIG. 2B is a detailed functional diagram illustrating the OS-independent driver 230 of FIG. 2A according to one embodiment of the invention.

FIG. 2B is a detailed functional diagram illustrating the OS-independent driver 230 of FIG. 2A according to one embodiment of the invention. The OS-independent driver 230 includes an AtOSInit() function 252, an AtTaskCreate() function 254, an AtTaskDelete() function 256, a GetExtendedBuffero function 258, a ContextSwitching() function 260, and an EnhanceDNA() function 262. The OS-independent driver 230 interfaces to a TraditionalDNA() function 264.

The AtOSInit() function 252 is performed at the OS initializing time. It allocates buffers in memory of sufficient size to store the traditional and extended states of the processing units. The AtTaskCreateo function 254 allocates a buffer in memory for the extended state of the created task. The AtTaskDeleteo function 256 frees an allocated buffer when the corresponding task is terminated. The GetExtendedBuffero function 258 obtains the buffer allocated to store the extended state of the specified task. The ContextSwitching() function 260 manages the state of the outgoing task. The EnhanceDNA() function 262 maintains the extended states of the outgoing and incoming task and updates the states of the processing unit at task switching.

The TraditionalDNA() function 264 is the DNA handler routine or function than can be invoked by the OS. The TraditionalDNA() function 264 provides the mechanism for saving and restoring of the traditional state of the processing unit.

Figure 3:
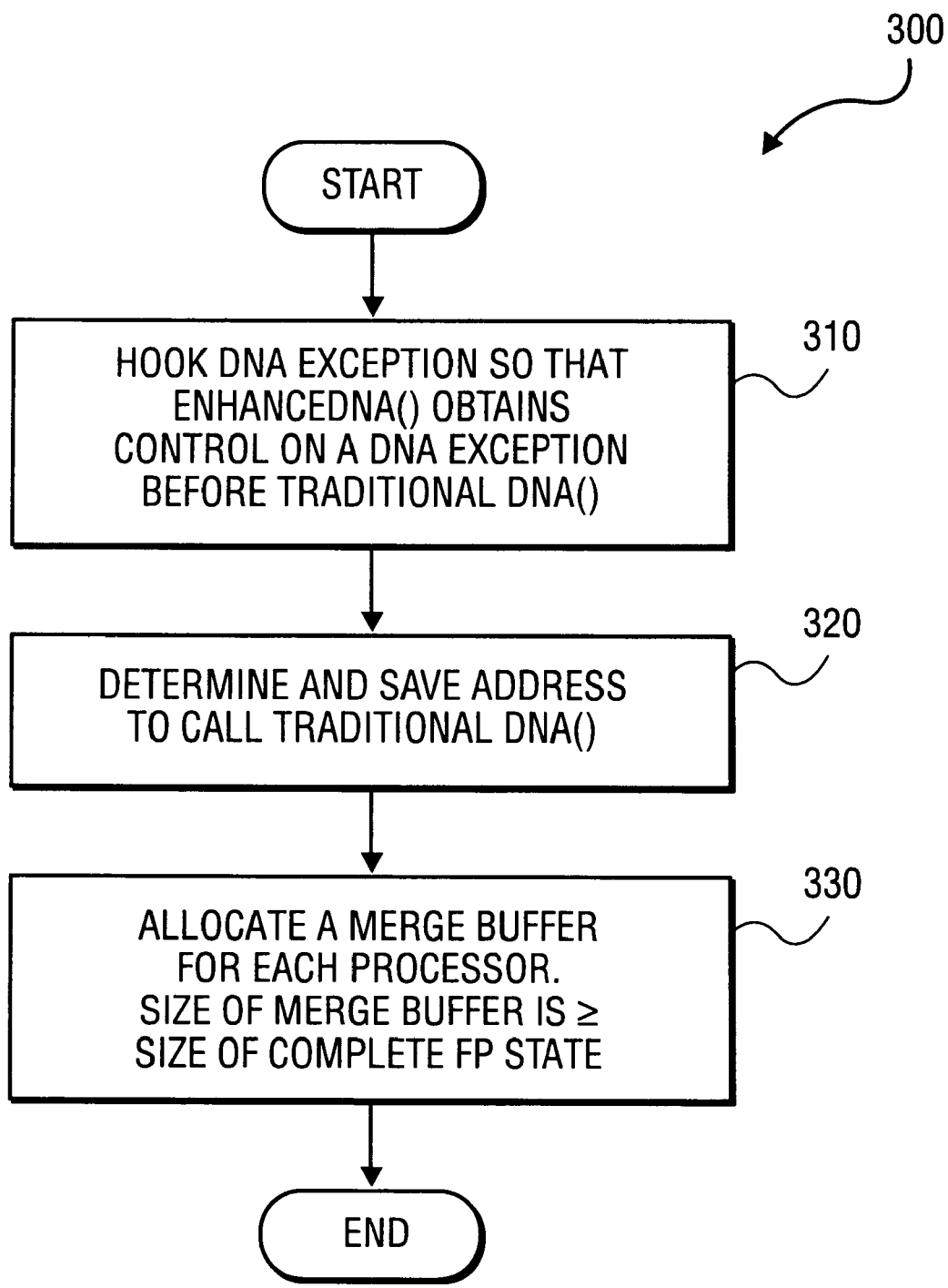
FIG. 3 is a diagram illustrating an initializing process according to one embodiment of the invention.

FIG. 3 is a diagram illustrating an initializing process 300 according to one embodiment of the invention. The initializing process 300 is performed at the OS initializing time and represents the AtOSInito function 252 shown in FIG. 2B.

Upon START, the process 300 hooks the "Device Not Available" (DNA) exception so that the EnhanceDNA() function 262 (FIG. 2B) obtains control on a "Device Not Available" exception before control passes to the TraditionalDNA() function 264 (Block 310). Then, the process 300 determines the address of the TraditionalDNA() function 264 from the OS and saves this address for later use (Block 320). Then, the process 300 allocates a merge buffer for each processor in the system (Block 330). The merge buffer may be allocated in any convenient memory, including the main memory and the cache memory. The size of the merge buffer is greater than or equal to the size of the full processing unit state which includes both the traditional and the extended states. Then, the process 300 completes.

Figure 4:
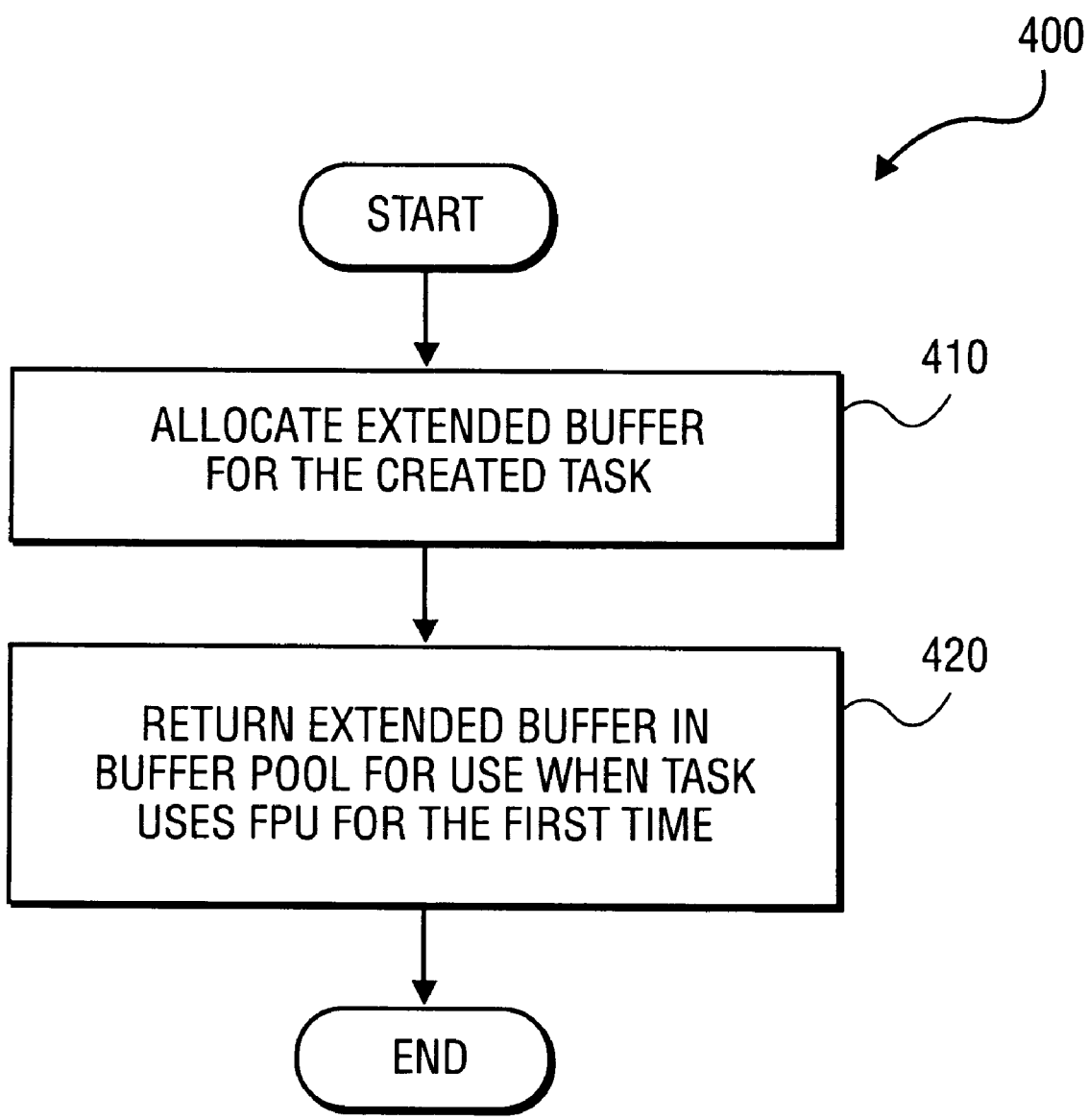
FIG. 4 is a diagram illustrating a task creating process according to one embodiment of the invention.

FIG. 4 is a diagram illustrating a task creating process 400 according to one embodiment of the invention. The process 400 creates a task and represents the AtTaskCreate() function.

Upon START, the process 400 allocates an extended buffer (XBUF) for the created task to save the extended state of the created task (Block 410). The XBUF can be allocated in any convenient memory, including main and cache memories. The size of the XBUF is greater than or equal to the size of the extended state. Then the process 400 retains the XBUF in a pool of buffers for use when the associated task uses the processing unit for the first time (Block 420). Then the process 400 completes.

Figure 5:
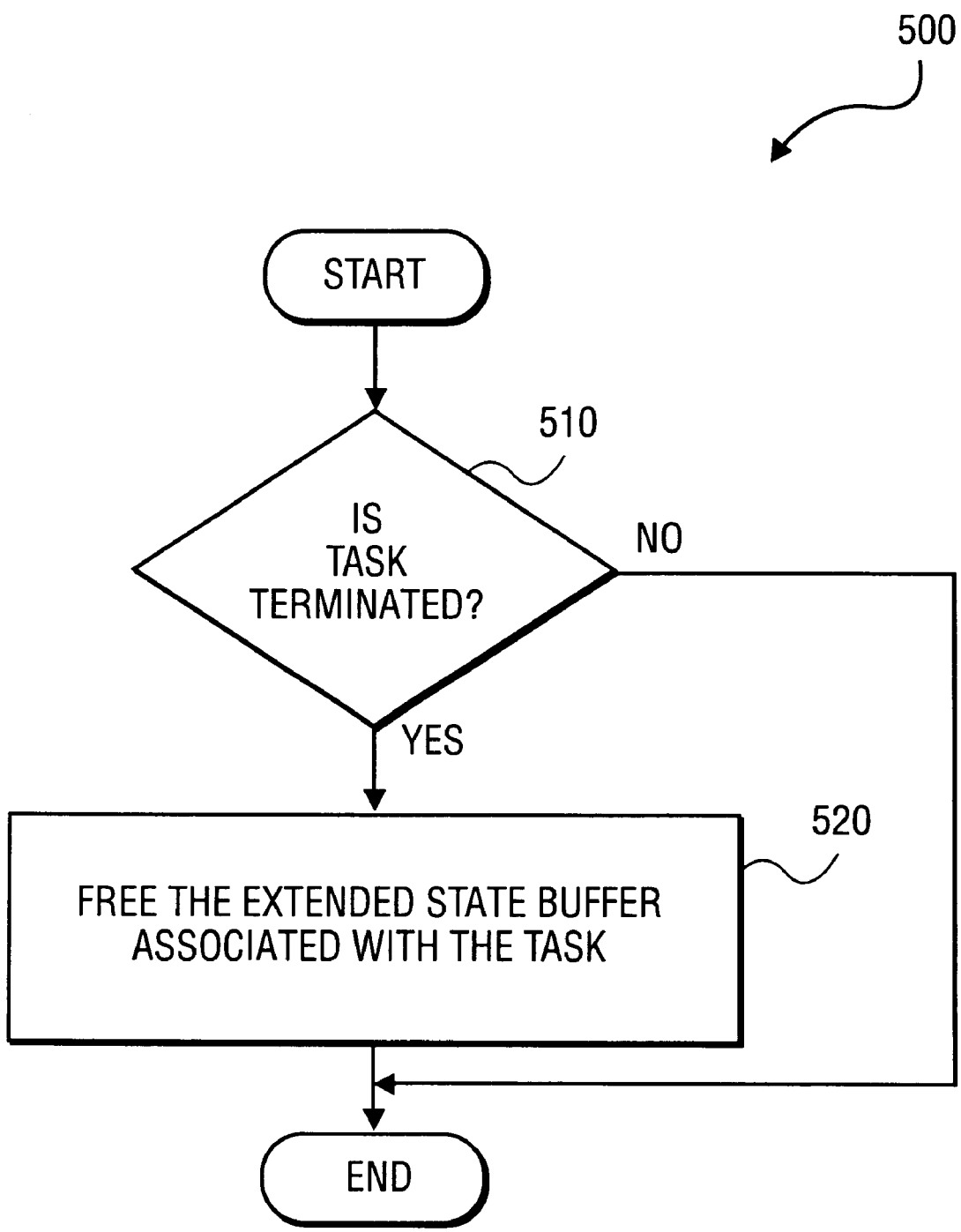
FIG. 5 is a diagram illustrating a task deleting process according to one embodiment of the invention.

FIG. 5 is a diagram illustrating a task deleting process 500 according to one embodiment of the invention. The process 500 is executed when the task is terminated by the OS and represents the AtTaskDeleteo() function 256.

Beginning from a START state, the process 500 proceeds to determine if the task is being terminated (Block 510). If not, the process 500 is terminated. If the task is being terminated, the process 500 frees the XBUF associated with this task (Block 520). This XBUF is the buffer that was allocated to save the extended state when the task was created. Then the process 500 completes.

Figure 6:
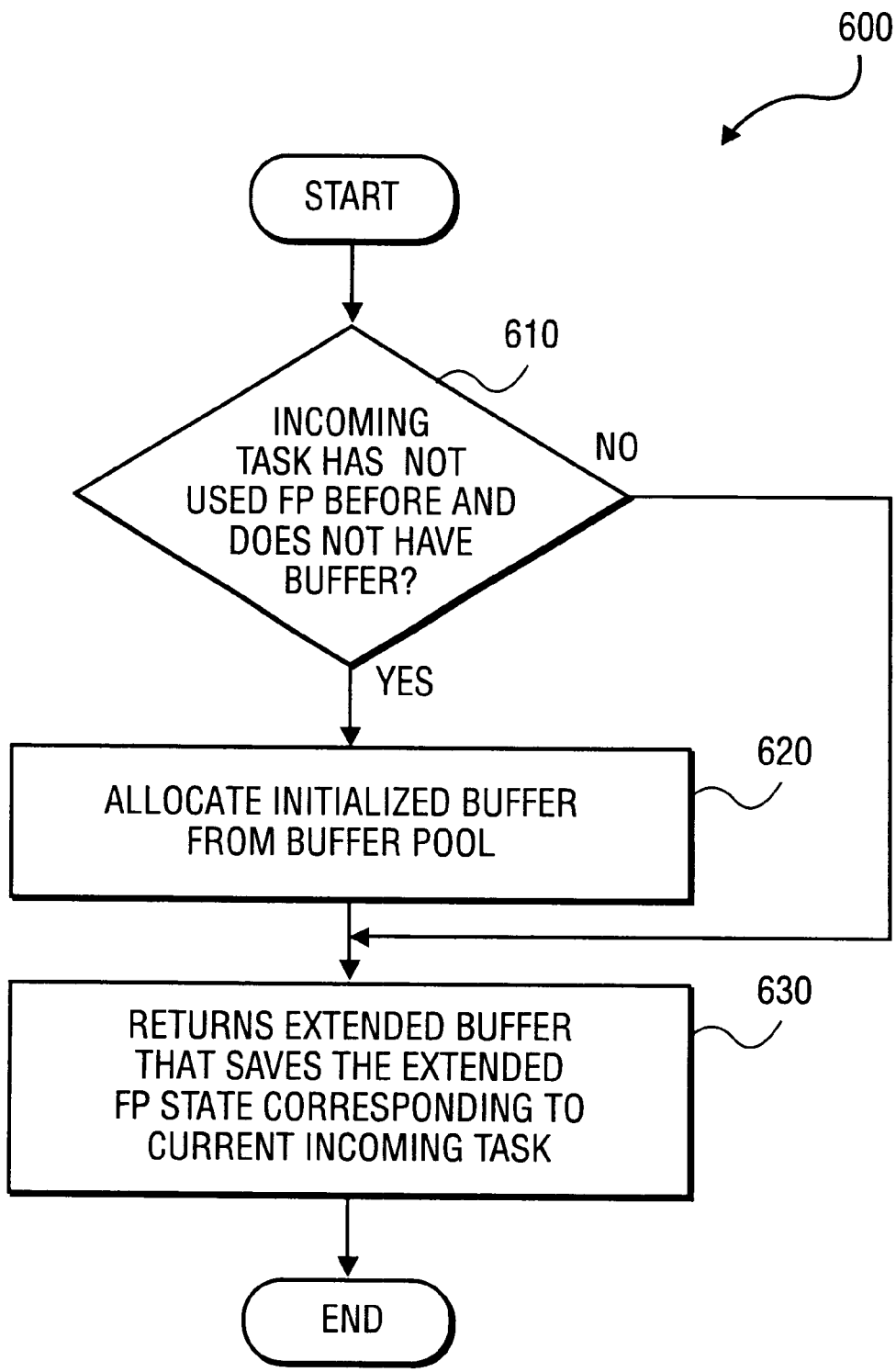
FIG. 6 is a diagram illustrating a get extended buffer process according to one embodiment of the invention.

FIG. 6 is a diagram illustrating a get extended buffer process 600 according to one embodiment of the invention. The process 600 provides the extended buffer and represents the GetExtendedBuffer() function 258.

Upon START, the process 600 determines if the incoming task has not used the processing unit before and if it does not have an associated buffer (Block 610). If the incoming task has used the processing unit before and if it already has an associated buffer, the process 600 returns the extended buffer (XBUF) that saves the extended state corresponding to the current incoming task (Block 630). If, at decision block 610, the process 600 determines that the incoming task has not used the processing unit before and it does not already have an associated buffer, the process 600 allocates the initialized buffer from the buffer pool (Block 620). The process 600 then returns the extended buffer (XBUF) that saves the extended state corresponding to the current incoming task (Block 630). The process 600 is then terminated.

Figure 7:
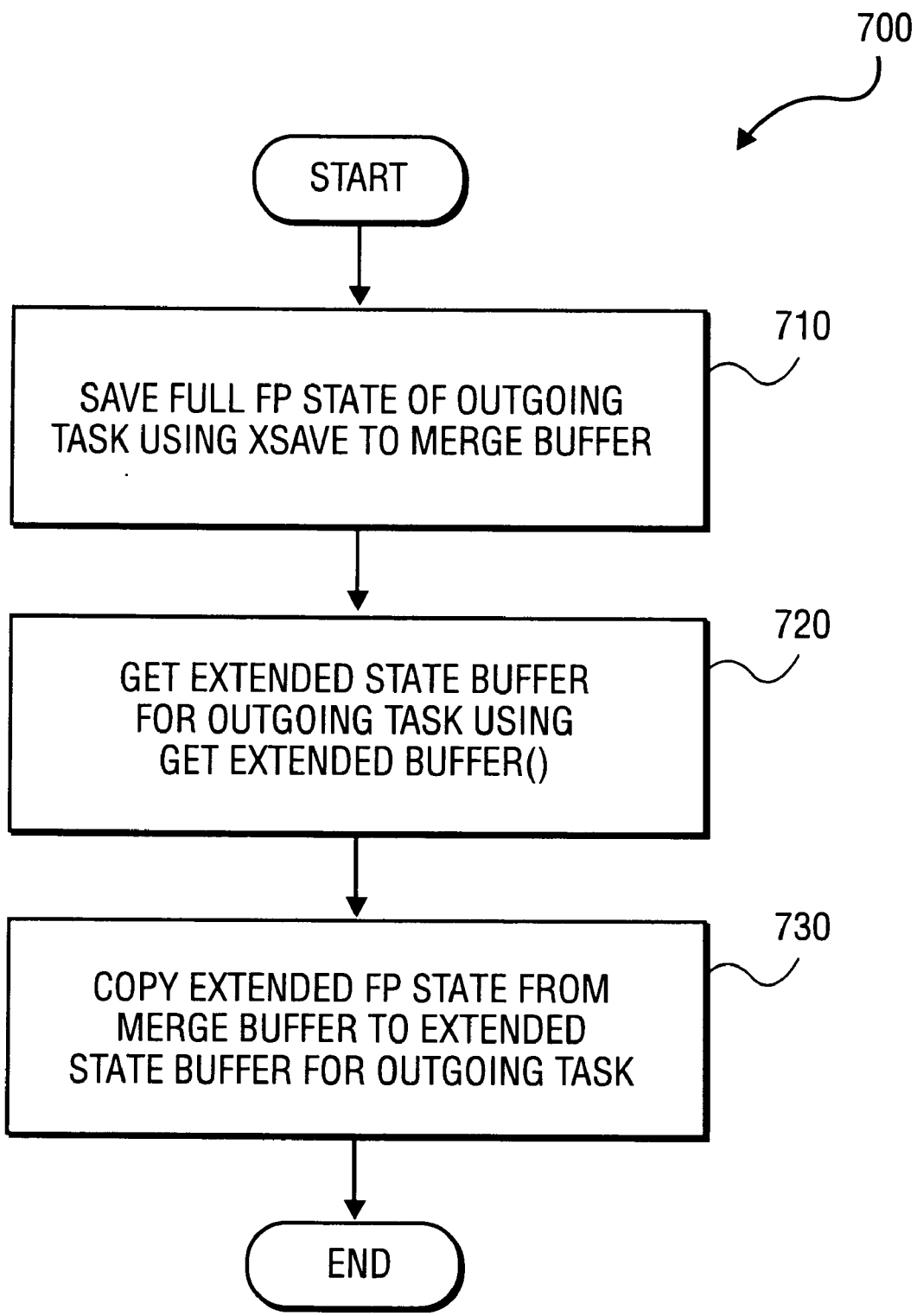
FIG. 7 is a diagram illustrating a context switching process according to one embodiment of the invention.

FIG. 7 is a diagram illustrating a context switching process 700 according to one embodiment of the invention. The process 700 performs context switching when a task is switched out and another task is switched in. The process 700 represents the ContextSwitch() function 260.

Upon START, the process 700 saves the full processing unit state of the outgoing task in a merge buffer (Block 710). The full processing unit state includes both the traditional and the extended states of the processing unit. The merge buffer is the merge buffer of the corresponding processor that was created by the AtOSInit() function 252 at initialization. In one embodiment, this saving is accomplished by executing the XSAVE instruction.

Then the process 700 obtains the extended buffer allocated for the outgoing task (Block 720). This can be performed by the GetExtendedBuffer() function 258 illustrated in the process 600 in FIG. 6. Next, the process 700 copies or transfers the contents of the extended state of the outgoing task from the merge buffer to the extended buffer (Block 730). Then the process 700 is terminated.

Figure 8:
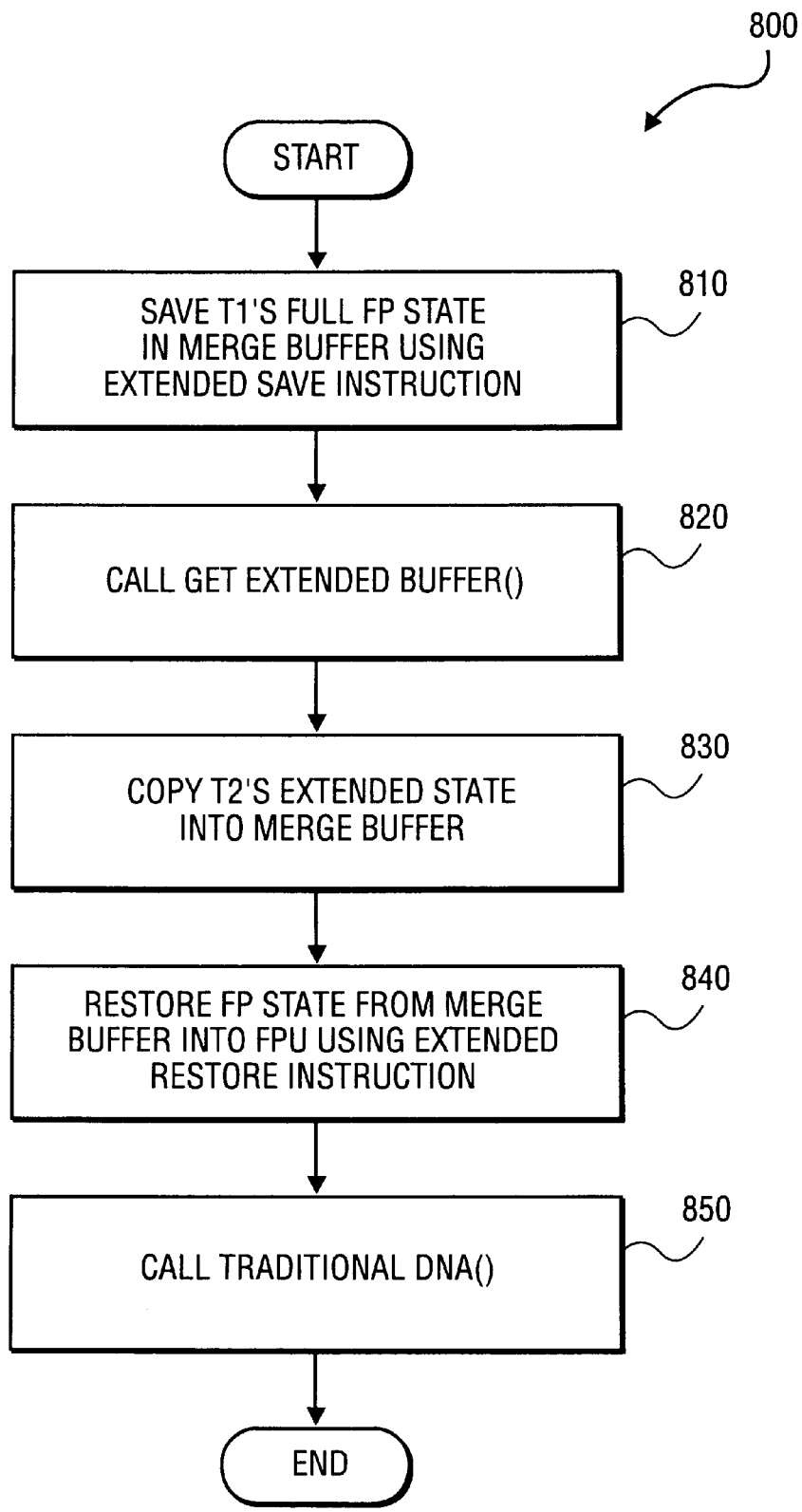
FIG. 8 is a diagram illustrating an enhanced DNA process according to one embodiment of the invention.

FIG. 8 is a diagram illustrating a process 800 according to one embodiment of the invention. The process 800 manages the processing unit states of the outgoing task (T1) and the incoming task (T2), and represents the EnhanceDNA() function 262 shown in FIG. 2A.

Upon START, the process 800 saves the full states of T1 in the merge buffer (Block 810). This can be accomplished by executing the extended save instruction XSAVE. In a multiprocessor system, the merge buffer corresponds to the current processor. Then the process 800 obtains the extended buffer that stores the extended state of T2 (Block 820). This can be accomplished by invoking the GetExtendedBuffer() function 258 (FIG. 2A) as illustrated in the process 600 in FIG. 6. If T2 has not used the processing unit before, the GetExtendedBuffer() function 258 allocates a buffer from a pool of available extended buffers and returns an appropriately initialized buffer.

The process 800 next copies the extended state of T2 to the merge buffer (Block 830). The merge buffer now contains the traditional state of T1 and the extended state of T2. Then the process 800 restores the states from the merge buffer to the processing unit (Block 840). This can be accomplished by executing the extended restore instruction, XRESTORE. At this point, the processing unit contains the traditional state of T1 and the extended state of T2.

Then the process 800 passes control to the standard OS DNA exception handler by calling the TraditionalDNA() function 264 shown in FIG. 2B. The process 800 is then terminated.

Figure 9:
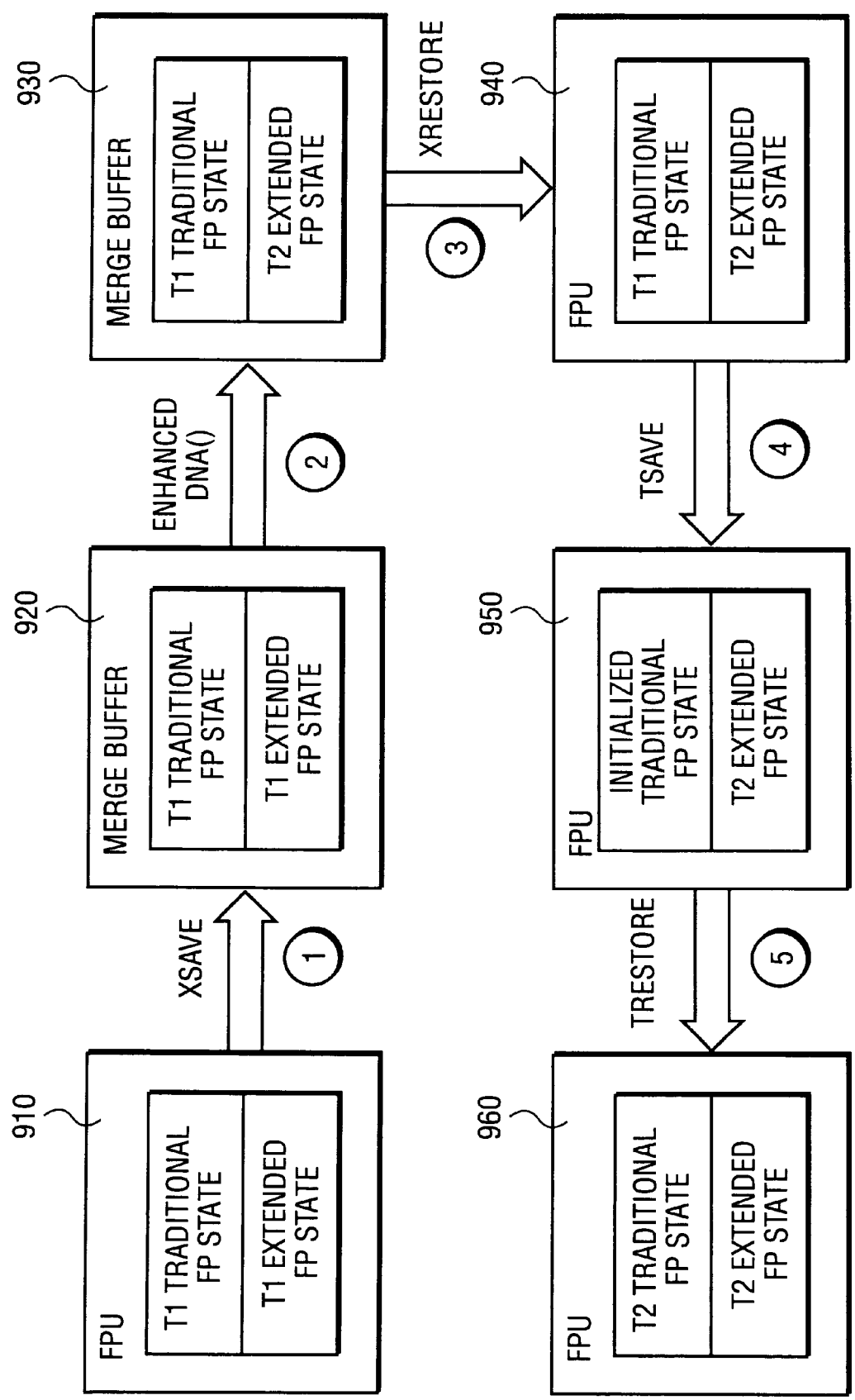
FIG. 9 is a diagram illustrating a sequence of acts in updating states of a processing unit according to one embodiment of the invention.

FIG. 9 is a diagram illustrating a sequence of steps in updating states of a processing unit according to one embodiment of the invention. The sequence includes an initial processing unit 910, an initial merge buffer 920, an updated merge buffer 930, an extended restored processing unit 940, an updated processing unit 950, and a final processing unit 960.

The initial processing unit 910 stores the traditional and extended states of the outgoing task 1 (T1). When context switching occurs and the incoming task 2 (T2) executes an instruction involving the processing unit, the driver invokes the EnhanceDNA() function 262 (FIG. 2B) to get control. The EnhanceDNA() function 262 executes the enhanced save function (e.g., XSAVE) to transfer the full states of T1 in the processing unit to the merge buffer as shown by the arrow numbered 1 to the initial merge buffer 920. The initial merge buffer 920 received the full states of T1 as transferred from the processing unit 910. The EnhanceDNA() function 262 then merges the extended state of T2 with the traditional state of T1 in the merge buffer as shown by the arrow numbered 2 to the updated merge buffer 930.

The updated merge buffer 930, now contains the traditional state of T1 and the extended state of T2. The EnhanceDNA() function 262 then restores the full states of the processing unit by copying or transferring the content of the merge buffer to the processing unit. This can be accomplished by executing the extended restore instruction, XRESTORE. Then the driver passes control to the TraditionalDNA() function 264 which is the standard OS DNA handler.

The processing unit 940 now contains the traditional state of T1 and the extended state of T2. The traditionalDNA() function 264 saves the traditional state of T1 and handles all the traditional pending exceptions related to the processing unit. The traditional saving can be accomplished by executing the traditional save instruction, TSAVE, as shown by the arrow numbered 4 to the first updated processing unit 950.

The updated processing unit 950 now contains the initialized traditional state of T1 and the extended state of T2. The TraditionalDNA() function 264 then restores the traditional state of T2. This can be accomplished by executing the traditional restore instruction, TRESTORE, as shown by the arrow numbered 5 to the final processing unit 960.

The final processing unit 960 now contains the traditional and extended states of T2. The task switching is completed. T1 has been switched out and T2 is now switched in with its final processing unit states.

The present invention thus provides an apparatus and technique for performing task switching to update the traditional and extended states of a processing unit in a processor without modifying the operating system. The technique is transparent to the user and existing operating systems may be used to implement the invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to switch first and second tasks in an operating system (OS) comprising:

for the first task having a first traditional state and a first extended state, the second task having a second traditional state and a second extended state, each of the traditional and extended states being in a processing unit,
(a) saving the first traditional and extended states from the processing unit to a merge buffer;
(b) updating the merge buffer by replacing the first extended state by the second extended state, the second extended state being received from an extended buffer; and
(c) restoring the first traditional state and the second extended state in the processing unit from the updated merge buffer.

2. The method of claim 1, further comprising:
(d) saving the first traditional state from the processing unit; and
(e) restoring the second traditional state in the processing unit.

3. The method of claim 1, wherein (a) comprises:
(a1) creating the merge buffer having a size sufficiently large to hold the traditional and extended states; and
(a2) performing an extended save operation to save the first traditional and extended states to the merge buffer.

4. The method of claim 1, wherein (c) comprises:
(c1) performing an extended restore operation to restore the first traditional state and the second extended state, from the merge buffer to the processing unit.

5. The method of claim 2, wherein (d) comprises:
(d1) performing a traditional save operation to save the first traditional state; and
(d2) handling pending exceptions associated with the processing unit.

6. The method of claim 2, wherein (e) comprises:
(e1) performing a traditional restore operation to restore the second traditional state to the processing unit.

7. The method of claim 1, further comprising:
allocating the extended buffer when one of the first and second tasks is created, the extended buffer having a size sufficient to store the extended state; and
freeing the allocated extended buffer when the created task is terminated.

8. The method of claim 1, further comprising:

returning an allocated extended buffer for the second task; and allocating an appropriately initialized extended buffer if the first task has not used the processing unit and does not have an extended buffer.

9. The method of claim 1, wherein the processing unit is a floating-point unit (FPU).

10. The method of claim 1, wherein the OS is one of: a Windows 98 OS, a Windows 2000 OS, a Windows NT OS, a Windows 95 OS, a Linux OS, a BEOS, a Solaris OS, and a Unixware OS.

11. A computer program product comprising:

a computer usable medium having computer program code embodied therein for switching first and second tasks in an operating system, the first task having a first traditional state and a first extended state, the second task having a second traditional state and a second extended state, each of the traditional and the extended states being in a processing unit, the computer program product having:

(a) computer readable program code for saving the first traditional and extended states from the processing unit to a merge buffer;

(b) computer readable program code for updating the merge buffer by replacing the first extended state by the second extended state, the second extended state being received from an extended buffer; and (c) computer readable program code for restoring the first traditional state and the second extended state in the processing unit from the updated merge buffer.

12. The computer program product of claim 11, further comprising:

(d) computer readable program code for saving the first traditional state from the processing unit; and (e) computer readable program code for restoring the second traditional state in the processing unit.

13. The computer program product of claim 11, wherein (a) comprises:

(a1) computer readable program code for creating the merge buffer having a size sufficiently large to hold the traditional and extended states; and (a2) computer readable program code for performing an extended save operation to save the first traditional and extended states to the merge buffer.

14. The computer program product of claim 11, wherein (c) comprises:

(c1) computer readable program code for performing an extended restore operation to restore the first traditional state and the second extended state, from the merge buffer to the processing unit.

15. The computer program product of claim 12, wherein (d) comprises:

(d1) computer readable program code for performing a traditional save operation to save the first traditional state; and (d2) computer readable program code for handling pending exceptions associated with the processing unit.

16. The computer program product of claim 12, wherein (e) comprises:

(e1) computer readable program code for performing a traditional restore operation to restore the second traditional state to the processing unit.

17. The computer program product of claim 11, further comprising:

computer readable program code for allocating the extended buffer when one of the first and second tasks is created, the extended buffer having a size sufficient to store the extended state; and computer readable program code for freeing the allocated extended buffer when the created task is terminated.

18. The computer program product of claim 11, further comprising:

computer readable program code for returning an allocated extended buffer for the second task; and computer readable program code for allocating an appropriately initialized: extended buffer if the first task has not used the processing unit and does not have an extended buffer.

19. The computer program product of claim 11, wherein the processing unit is a floating-point unit (FPU).

20. The computer program product of claim 11, wherein the OS is one of: a Windows 98 OS, a Windows 2000 OS, a Windows NT OS, a Windows 95 OS, a Linux OS, a BEOS, a Solaris OS, and a Unixware OS.

21. A system comprising:

a processor having a processing unit;

an operating system (OS) having a traditional device not available (DNA) exception handler; and a OS-independent driver coupled to the OS to switch first and second tasks, the first task having a first traditional state and a first extended state, the second task having a second traditional state and a second extended state, each of the traditional and extended states being in the processing unit, the driver comprising an enhance DNA function, the enhance DNA function causing the processor to execute instructions to:

(a) save the first traditional and extended states from the processing unit to a merge buffer, (b) update the merge buffer by replacing the first extended state by the second extended state, the second extended state being received from an extended buffer, (c) restore the first traditional state and the second extended state in the processing unit from the updated merge buffer, and (d) pass control to the traditional DNA function.

22. The system of claim 21, wherein the traditional DNA function:

saves the first traditional state from the processing unit; and restores the second traditional state in the processing unit.

23. The system of claim 21, wherein the driver further comprises:

an initializing function to pass control to the enhance DNA function;

a task create function to allocate the extended buffer for a created task;

a task deleting function to free the allocated extended buffer when the created task is terminated; and an extended buffer function to return the extended buffer to the enhance DNA function and to allocate an appropriately initialized buffer if the second task has not used the processing unit and does not have an associated buffer.

24. The system of claim 21, wherein the enhance DNA function:

saves the first enhance state from the merge buffer; and restores the second enhance state in the merge buffer.

25. The system of claim 21, wherein the processing unit is a floating-point unit (FPU).

* * * * *

UNITED STATES PATENT AND TRADEMARK OFFICE
CERTIFICATE OF CORRECTION

PATENT NO.   : 6,526,431 B1
DATED        : February 25, 2003
INVENTOR(S)  : Bigbee et al.

It is certified that error appears in the above-identified patent and that said Letters Patent is hereby corrected as shown below:

Column 5,
Lines 29 and 30, delete "GetExtendedBuffero", insert -- GetExtendedBuffer() --.
Line 36, delete "AtTaskCreateo", insert -- AtTaskCreate() --.
Line 36, delete "AtTaskDeleteo", insert -- AtTaskDelete() --.
Lines 39 and 40, delete "GetExtended Buffero", insert -- GetExtendedBuffer().
Line 54, delete "AtOSInito", insert -- AtOSInit() --.

Column 6,
Line 19, delete "AtTaskDeleteo()", insert -- AtTaskDelete() --.

Signed and Sealed this

Seventh Day of October, 2003

JAMES E. ROGAN
*Director of the United States Patent and Trademark Office*